April 9, 1963 S. C. MARTIN 3,084,552
PRESSURE INDICATING DEVICE
Filed June 6, 1960 2 Sheets-Sheet 1
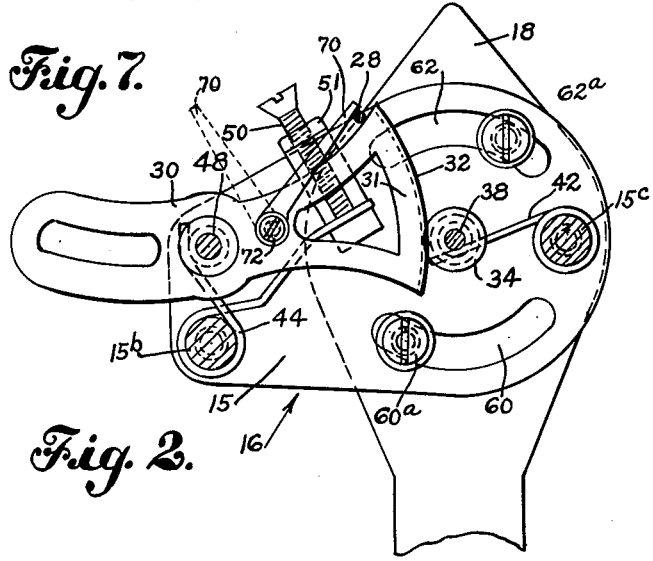
Fig. 7.
Fig. 2.
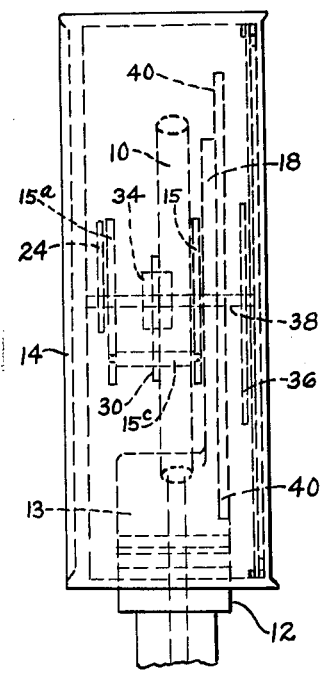
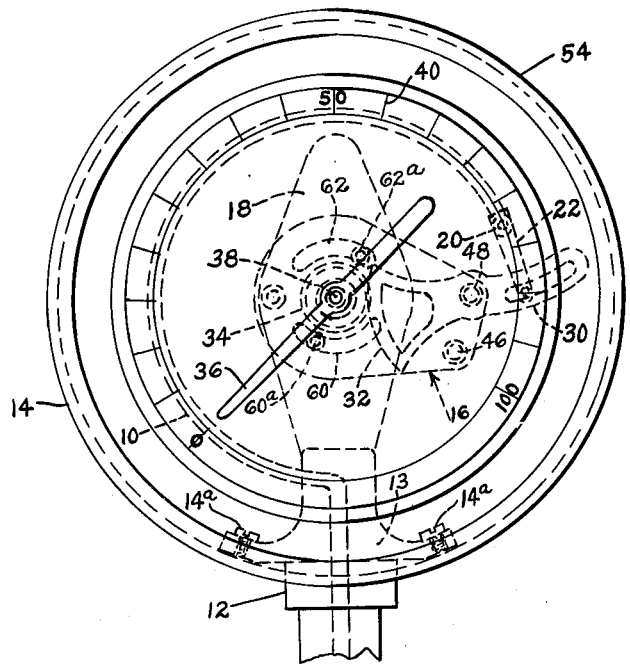
Fig. 1.
Inventor
Sidney C. Martin
By Harold E. Cole
Attorney April 9, 1963  S. C. MARTIN  3,084,552
PRESSURE INDICATING DEVICE
Filed June 6, 1960 2 Sheets-Sheet 2
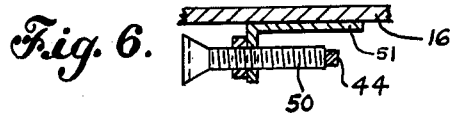
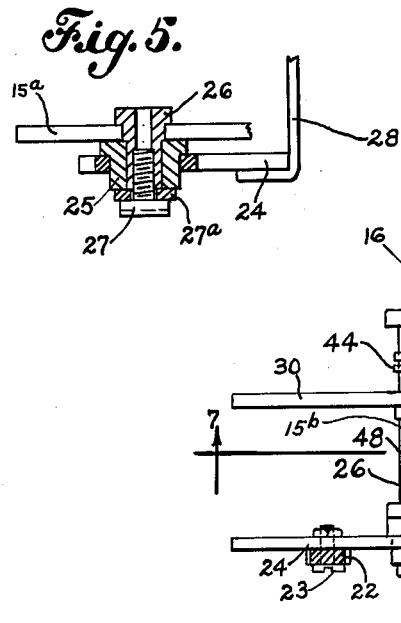
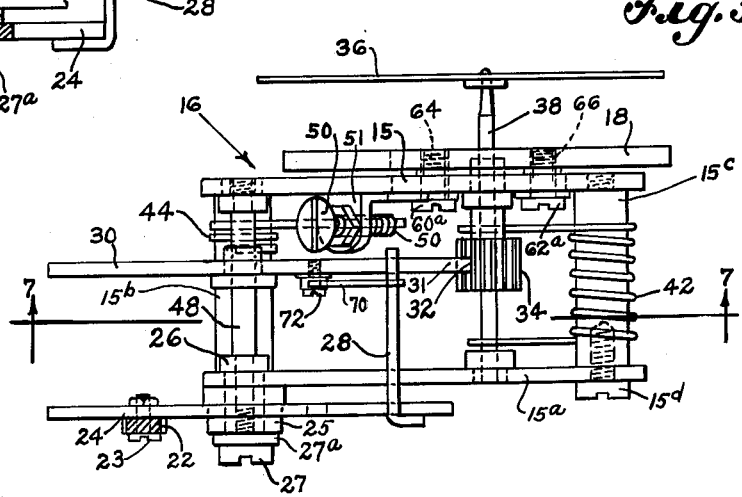
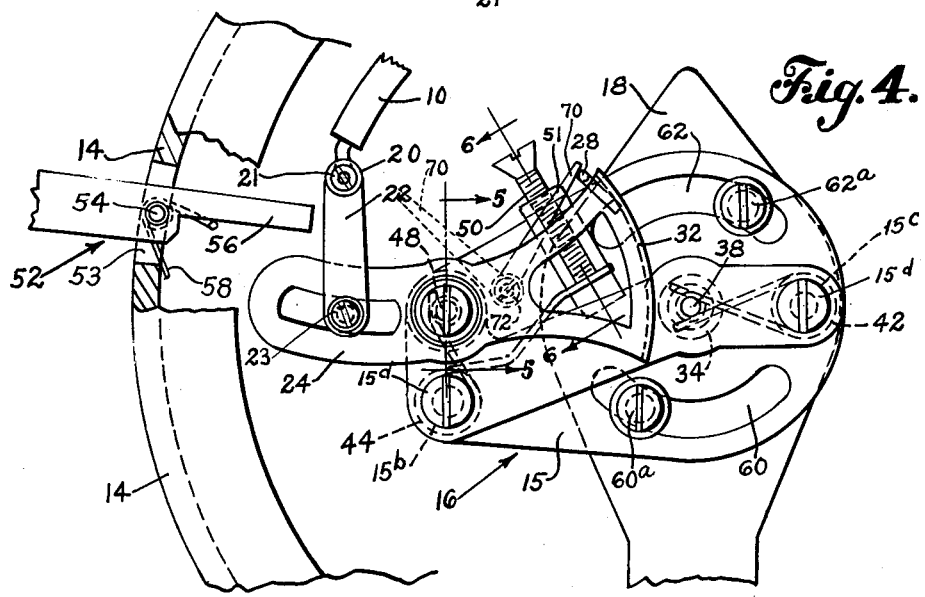
Inventor
Sidney C. Martin
By Harold E. Cole
Attorney United States Patent Office 3,084,552
Patented Apr. 9, 1963

3,084,552
PRESSURE INDICATING DEVICE
Sidney C. Martin, 12 Bridge St., Concord, N.H.
Filed June 6, 1960, Ser. No. 34,067
2 Claims. (Cl. 73—417)

This invention relates to a pressure indicating device for connection to the tube of a pressure gauge, the latter commonly being known as a Bourdon gauge.

One object of my invention is to provide a pressure indicating device having mechanism with an indicating pointer to give a pressure reading, which device leaves the indicating pointer at the point it was moved to, after the pressure ceases.

Another object is to provide mechanism operated independently, that will return the indicating pointer to starting position, whenever desired.

A further object is to provide frame means for my indicator movement that is adjustable relative to the pressure gauge part of my device.

The foregoing and other objects, which will appear as the nature of the invention is better understood, may be accomplished by a construction, combination and operative arrangement of parts such as is disclosed by the drawings. The nature of the invention is such as to render it susceptible to various changes and modifications, and therefore, I am not to be limited to the construction disclosed by the drawings nor to the particular parts described in the specification; but am entitled to all such changes therefrom as fall within the scope of my claims.

In the drawings:

FIG. 1 is a front elevational view of my device shown connected to a Bourdon pressure gauge tube.

FIG. 2 is a side elevational view thereof.

FIG. 3 is a top plan view showing the principal parts of the movement of my device, omitting the casing.

FIG. 4 is a rear elevational view showing the movement of my device and including a portion of the casing and actuating arm.

FIG. 5 is a sectional view taken on the line 5—5 of FIG. 4.

FIG. 6 is a sectional view taken on the line 6—6 of FIG. 1.

FIG. 7 is a sectional view taken on the line 7—7 of FIG. 3.

As illustrated, a well-known Bourdon tube 10 is connected to supporting means having a conduit 12 connected to an angular support 13 having an extension support 18, later described. Said support 13 is attached to a case or housing 14 by screws 14a.

A movement 16 has frame means embodying two frame members 15 and 15a opposite each other, which are connected by studs 15b and 15c one end of which screws into said frame member 15. Screws 15d screw-threadedly connect with said studs to hold said frame member 15a.

Said Bourdon tube 10 has a tip 20 that is fixedly connected by a screw 21, to a movable link 22 which in turn is connected to a slotted lever 24 by a screw 23, said lever forming part of said movement 16.

Said lever 24 is rotatably mounted on a bushing 25 held by a screw 27 with a washer 27a between them. Another bushing 26 extends into said bushing 25 and is held within the latter by said screw 27. An angular contact arm 28 is fixedly attached to said lever 24, as by soldering. This arm 28 normally contacts an actuating lever 30 pivoted on a shaft 48, later described, whereby said actuating lever 30, when contact is established, moves with said lever 24; but in one direction only. Said actuating member 30 has a sector portion 31 with gear teeth 32 that mesh with the teeth of a pinion gear 34 that is fixed to a shaft 38, later described, on which latter an indicating pointer 36 is fixedly mounted. Rotative movement of said lever 30 rotates said pinion gear 34 and shaft 38, which in turn moves said pointer 36 in an arc across the face of a dial 40 to register pressure.

When pressure is applied to said Bourdon tube, said lever 24 is moved in a clockwise direction, causing said contact arm 28 to move said lever 30 in a clockwise direction. Said pinion shaft 38 and pointer 36 simultaneously move in the opposite direction from said lever 30. When pressure is released from the Bourdon tube 10, said lever 24 and actuating arm 28 automatically return to their original positions. Said lever 30, pinion gear 34, shaft 38 and pointer 36 stay in the position to which they were moved.

To stabilize said pinion shaft 38 and lever 30, a spring 42 is wound around the stud 15c and extends beyond, with both ends of the spring bearing against opposite portions of the pinion shaft 38. Another spring 44 is wound around the stud 15b with one end bearing against said lever 30 and the other end bearing against an adjusting screw 50 which latter increases or decreases the pressure on the lever 30. Said screw 50 screw-threadedly connects in a hole in an angular bracket 51 attached to said frame member 15.

An actuating arm 52, to manually effect return of said pointer 36 to normal position, extends through a hole 53 in said case 14 and is pivotally attached by a pin 54 to said case. This arm has an extension part 56 extending into the latter. Said arm 52 is movable into contact with lever 30 when the latter is in registering position, to thus return said lever 30, pinion 34, shaft 38 and pointer 36 to their starting or normal positions. A tension spring 58 is coiled around said pin 54 with its ends bearing against said case 14 and said arm extension part 56 to thereby hold said arm 52 in predetermined, inoperative position normally.

Said frame 15 has two arcuate slots 60 and 62 therethrough to receive two screws 60a and 62a respectively which screw-threadedly connect in two threaded holes 64 and 66 respectively in said extension support 18. These slots permit rotative movement of said frame 15 relative to said support 18 when it is desired to change the position of said frame 15.

To enable the calibration of my device following the usual practice, I provide a retaining pin 70 that may be firmly attached, in effective position, by a screw 72 that screw-threadedly engages said lever 30. This keeps said contact arm 28 and said retaining pin 70 in operative association, with said pin 70 on the outside. Thus upon the return movement of said lever 24, said retaining pin 70 with said lever 30 are thereby carried back to starting position. When calibration is completed said screw 72 is loosened and thereby becomes ineffective, and said pin 70 is moved out of the way to a position such as shown in the dash lines in said FIG. 7 for instance.

What I claim is:

1. An indicating movement for a pressure indicating device comprising frame means, a shaft rotatably mounted in said frame means, an indicating pointer attached to said shaft, a first lever, means connecting said shaft and first lever whereby said shaft is rotated upon actuation of said first lever, another lever adapted to be actuated by movement of a pressure gauge tube, a contact arm carried by said other lever and normally in contact with said first lever to move the latter upon movement of said other lever, another shaft supported by said frame means on which both said levers are rotatably mounted, a retaining member outside of and in contact with said contact arm in position of use, and movable means to hold said retaining member in contact with said arm when in effective position and to permit said retaining member to move away from said contact arm in position of non-use when in ineffective position.

2. An indicating movement for a pressure indicating device comprising frame means, a shaft rotatably mounted in said frame means, an indicating pointer attached to said shaft, a first lever, means connecting said shaft and said first lever embodying a pinion embodying teeth fixed on said shaft and teeth carried by said first lever adapted to mesh with said pinion teeth whereby said shaft is rotated upon actuation of said first lever, another lever adapted to be actuated by movement of a pressure gauge tube, a contact arm carried by said other lever and normally in contact with said first lever to move the latter upon movement of said other lever, another shaft supported by said frame means on which both said levers are rotatably mounted, a retaining member outside of, extending angularly relative to, and in contact with, said contact arm in position of use, and movable means to hold said retaining member in said contact with said arm when in effective position and to permit said retaining member to move away from said contact arm into position of non-use when in ineffective position.

References Cited in the file of this patent

UNITED STATES PATENTS

| | | |
|---|---|---|
| 1,460,249 | Kraft | June 26, 1923 |
| 1,616,628 | Ingham | Feb. 8, 1927 |
| 1,641,838 | Burkhardt | Sept. 6, 1927 |
| 1,713,283 | Johnson | May 14, 1929 |